(12) United States Patent
Kim et al.

(10) Patent No.: US 11,823,593 B2
(45) Date of Patent: Nov. 21, 2023

(54) METHOD FOR DISPLAYING LEARNING CONTENT OF TERMINAL AND APPLICATION PROGRAM THEREFOR

(71) Applicant: RIIID INC., Seoul (KR)

(72) Inventors: Kyung Hoon Kim, Seoul (KR); Min Sung Noh, Seoul (KR); Jae We Heo, Gyeonggi-do (KR); Soon Woo Kwon, Seoul (KR); Jin Seo Yoon, Seoul (KR)

(73) Assignee: RIIID INC.

( * ) Notice: Subject to any disclaimer, the term of this patent is extended or adjusted under 35 U.S.C. 154(b) by 20 days.

(21) Appl. No.: 17/719,352

(22) Filed: Apr. 12, 2022

(65) Prior Publication Data

US 2022/0319348 A1    Oct. 6, 2022

Related U.S. Application Data

(63) Continuation of application No. 16/467,016, filed as application No. PCT/KR2017/005918 on Jun. 7, 2017, now Pat. No. 11,322,036.

(30) Foreign Application Priority Data

Dec. 5, 2016   (KR) .................... 10-2016-0164061

(51) Int. Cl.
  *G06F 3/048* (2013.01)
  *G09B 7/08* (2006.01)
  (Continued)

(52) U.S. Cl.
  CPC ............. *G09B 7/08* (2013.01); *G06F 3/0482* (2013.01); *G06F 3/04845* (2013.01);
  (Continued)

(58) Field of Classification Search
  CPC .... G09B 7/08; G09B 5/02; G09B 7/06; G06F 3/0482; G06F 3/04845; G06F 3/04855;
  (Continued)

(56) References Cited

U.S. PATENT DOCUMENTS 5,407,357 A * 4/1995 Cutler .................... G09B 7/063
                                            434/335
5,797,601 A * 8/1998 Ritchie ..................... A63F 9/18
                                            434/347

(Continued)

FOREIGN PATENT DOCUMENTS

CN       1744148 A  *  3/2006
CN      104423703      3/2015
(Continued)

OTHER PUBLICATIONS

"Bureau of Investigation after GLOBEX in those taking TOEIC, but the new format learning corresponding to services," Biglobe, Jan. 15, 2016, https://www.biglobe.co.jp/pressroom/info/2016/11/161115-1 (with English translation), 9 pages.

(Continued)

*Primary Examiner* — Hua Lu
(74) *Attorney, Agent, or Firm* — Adsero/Quarles & Brady LLP (57) ABSTRACT

The present invention relates to a method for displaying learning content of a terminal and an application program therefor. The method for displaying learning content of a terminal of the present invention comprises the steps of: displaying text with a group of questions on a first layer; displaying a first question card corresponding to a first question on a second layer; and when a continuous touch gesture in a touch input is received in the second layer, displaying, on the second layer, a second question card corresponding to a second question according to the touch gesture, wherein the question card includes one or more examples that are selectable by a learner. According to the present invention, it is possible to effectively display learning content including a large amount of information such as multiple choice questions on a limited size screen.

18 Claims, 8 Drawing Sheets

(51) Int. Cl.
  *G06F 3/0482* (2013.01)
  *G06F 3/04845* (2022.01)
  *G06F 3/04855* (2022.01)
  *G06F 3/04883* (2022.01)
  *G06F 3/16* (2006.01)

(52) U.S. Cl.
  CPC ...... *G06F 3/04855* (2013.01); *G06F 3/04883* (2013.01); *G06F 3/167* (2013.01)

(58) Field of Classification Search
  CPC ........ G06F 3/04883; G06F 3/167; G06F 8/38; G06F 3/041; G06Q 50/10; G06Q 50/20
  See application file for complete search history.

(56) References Cited

U.S. PATENT DOCUMENTS

| | | | |
|---|---|---|---|
| 10,534,528 B2 * | 1/2020 | Mesguich Havilio | G09B 7/00 |
| 11,126,346 B2 | 9/2021 | Mesguich Havilio | |
| 11,322,036 B2 * | 5/2022 | Kim | G09B 5/02 |
| 2003/0034999 A1 * | 2/2003 | Coughlin, III | G09B 7/00 715/738 |
| 2005/0191603 A1 * | 9/2005 | Budra | G09B 7/08 434/178 |
| 2006/0172275 A1 * | 8/2006 | Cohen | G09B 7/00 434/350 |
| 2006/0216685 A1 * | 9/2006 | Brodie | G09B 7/02 434/323 |
| 2008/0032277 A1 * | 2/2008 | Maggio | G09B 7/04 434/362 |
| 2008/0254419 A1 * | 10/2008 | Cohen | G09B 5/04 434/219 |
| 2010/0112532 A1 * | 5/2010 | Kakui | G09B 5/00 434/129 |
| 2010/0190143 A1 * | 7/2010 | Gal | G09B 7/00 434/322 |
| 2011/0086330 A1 * | 4/2011 | Mounia | G09B 7/066 434/154 |
| 2011/0189644 A1 * | 8/2011 | Milne | G09B 3/00 434/327 |
| 2012/0052467 A1 * | 3/2012 | Maybin | G09B 19/06 434/157 |
| 2012/0240025 A1 * | 9/2012 | Migos | G06F 3/0488 715/230 |
| 2013/0111401 A1 * | 5/2013 | Newman | G06Q 10/1053 715/810 |
| 2013/0218639 A1 * | 8/2013 | Nakagawa | G06Q 30/0203 705/7.32 |
| 2013/0266916 A1 * | 10/2013 | Weems | G09B 5/02 434/188 |
| 2014/0141888 A1 * | 5/2014 | Pavlish | G07F 17/3295 463/42 |
| 2014/0162243 A1 * | 6/2014 | Lamkin | G09B 7/02 434/365 |
| 2014/0274254 A1 * | 9/2014 | Leites | G06F 3/0483 463/11 |
| 2015/0104762 A1 * | 4/2015 | Luke | G09B 19/04 434/169 |
| 2015/0161664 A1 * | 6/2015 | Koppelmann | G06Q 30/0217 705/14.57 |
| 2015/0187225 A1 * | 7/2015 | Worsley | G09B 7/07 434/178 |
| 2015/0294578 A1 * | 10/2015 | Gil | G06F 16/22 434/335 |
| 2015/0325133 A1 * | 11/2015 | Gaglani | G09B 7/00 434/322 |
| 2016/0018968 A1 * | 1/2016 | Wilson | G06F 3/0488 715/763 |
| 2016/0055756 A1 * | 2/2016 | De Guzman | G09B 7/00 434/188 |
| 2016/0132216 A1 * | 5/2016 | Járdán | G06Q 30/0282 705/347 |
| 2016/0133062 A1 * | 5/2016 | Greenberg | G06F 40/106 701/29.4 |
| 2017/0004725 A1 * | 1/2017 | Kim | G09B 7/08 |
| 2019/0108773 A1 | 4/2019 | Wyner et al. | |
| 2019/0333402 A1 * | 10/2019 | Kim | G06F 3/04883 |
| 2020/0081600 A1 * | 3/2020 | Mesguich Havilio | G09B 7/00 |
| 2021/0043101 A1 * | 2/2021 | Kim | G06F 3/0488 |
| 2021/0240336 A1 * | 8/2021 | Wilson | G06F 3/0483 |

FOREIGN PATENT DOCUMENTS

| | | |
|---|---|---|
| JP | 1995181883 | 7/1995 |
| JP | 1998207330 | 8/1998 |
| JP | 1999265326 | 9/1999 |
| JP | 2004046255 | 2/2004 |
| JP | 2005164943 | 6/2005 |
| JP | 2006099031 | 4/2006 |
| JP | 2006259564 | 9/2006 |
| JP | 2010145668 | 7/2010 |
| JP | 6832083 B2 * | 2/2021 |
| KR | 10-2011-0115828 A | 10/2011 |
| KR | 10-2012-0105988 A | 9/2012 |
| KR | 1020120105988 | 9/2012 |
| KR | 1020120105988 A * | 9/2012 |
| KR | 10-2014-0073990 A | 6/2014 |
| KR | 10-2016-0111208 A | 9/2016 |
| KR | 1020160111208 | 9/2016 |
| KR | 1020160111208 A * | 9/2016 |
| KR | 1020180008109 A * | 1/2018 |
| KR | 101853892 B1 * | 4/2018 |
| WO | WO-2010062000 A1 * | 6/2010 ............ G06Q 50/10 |

OTHER PUBLICATIONS

International Search Report for PCT/KR2017/005918 dated Sep. 7, 2017, 5 pages (including the English translation).
"I Will Study English Grammar with SANTA TOEIC", Internet blog, Apr. 25, 2016. <URL:http://parkpurong.tistory.com/75>.
Office Action dated Jun. 11, 2021 from Japanese Application No. 2019-530127 (with English Translation), 16 pages.
Office Action dated Dec. 2, 2022 with respect to CN 201780075324.3 (w/English Abstract), 16 pages.

* cited by examiner

METHOD FOR DISPLAYING LEARNING CONTENT OF TERMINAL AND APPLICATION PROGRAM THEREFOR

CROSS-REFERENCE TO RELATED APPLICATIONS

This application is a continuation of U.S. application Ser. No. 16/467,016, entitled "METHOD FOR DISPLAYING LEARNING CONTENT OF TERMINAL AND APPLICATION PROGRAM THEREFOR", filed Jun. 5, 2019, which claims priority to and is a 35 U.S.C. § 371 national phase application of PCT/KR2017/005918 (WO2018/105833), filed on Jun. 7, 2017, entitled "METHOD FOR DISPLAYING LEARNING CONTENT OF TERMINAL AND APPLICATION PROGRAM THEREFOR" which application claims priority to and the benefit of Korean Patent Application No. 10-2016-0164061, filed Dec. 5, 2016; the disclosures of which are incorporated herein by reference in their entirety. Any disclaimer that may have occurred during the prosecution of the above-referenced applications is hereby expressly rescinded, and reconsideration of all relevant art is respectfully requested.

TECHNICAL FIELD

The present disclosure relates to a method for displaying learning content of a terminal and an application program therefor, and more particularly, to a method for effectively displaying learning content on a small screen of a terminal and an application program therefor.

BACKGROUND ART

As the market for electronic device applications becomes more active, a lot of learning content is being developed in the form of applications. Conventional learning applications can provide an auxiliary role for learners to easily access learning content by allowing video lectures to be watched in the application, providing content for memorization, or providing voice files.

Meanwhile, among learners, some learners aim to improve their overall performance in a specific field, but learners will use learning content to acquire a target score on a particular test.

Tests are designed to evaluate the learning ability and academic achievement of learners. Tests are generally composed of multiple choice questions in order to secure standardization and quantification of evaluation. All tests have certain patterns, and in particular, multiple choice questions consist of patterned questions, called types of questions. Therefore, it is known to be a very effective learning method to learn question patterns while solving many questions repeatedly.

Multiple choice questions are made up of text and examples, and some listening tests are provided only with examples. Conventionally, it has not been easy to find such multiple choice question content in applications. This is because it is not easy to display multiple choice question content including long text due to the characteristics of learning applications, which are executed on an electronic device with a relatively small screen.

However, considering the purpose and effects of learning, it is necessary to provide learning content by which a learner can repeatedly learn multiple choice questions, even through electronic device applications. Therefore, there is demand for a method of effectively displaying multiple choice question content composed of text and examples even on a small screen.

DETAILED DESCRIPTION OF THE INVENTION

Technical Problem

Therefore, the present disclosure has been made in view of the above-mentioned problems, and an aspect of the present disclosure is to provide a method of effectively displaying learning content including a large amount of information such as multiple choice questions within a screen having a limited size.

Also, another aspect of the present disclosure is to provide a method for displaying learning content, which may display a question-solving time and a required time in the learning content so that a learner can train to solve questions within a limited time.

Also, still another aspect of the present disclosure is to provide a method for displaying learning content having high usability and readability.

Also, yet another aspect of the present disclosure is to provide a method for displaying learning content, which may intuitively display results of question-solving to allow a learner to easily grasp his or her weaknesses, thereby maximizing the learning effect.

Technical Solution

In accordance with an aspect of the present disclosure, a method for displaying learning content of a terminal may include: displaying text with a group of questions on a first layer; displaying a first question card corresponding to a first question on a second layer; and when a touch input corresponding to an arbitrary direction on the second layer is received, displaying, on the second layer, a second question card corresponding to the touch input, wherein the question card includes one or more examples that are selectable by a learner.

In accordance with another aspect of the present disclosure, a method for displaying learning content of a terminal may include: displaying one or more question cards on a fourth layer; sequentially reproducing one or more voice files corresponding to each of the one or more question cards; and displaying a movement indicator on a fifth layer when the question card corresponding to the reproduced voice file is not displayed on the fourth layer.

In accordance with still another aspect of the present disclosure, a terminal for displaying learning content may include: a display unit configured to display one or more layers; an input unit configured to receive an input; and a control unit configured to control text with a group of questions to be displayed on a first layer and a first question card corresponding to a first question to be displayed on a second layer, and configured to control when a touch input corresponding to an arbitrary direction on the second layer is received, a second question card corresponding to the touch input to be displayed on the second layer, wherein the question card includes one or more examples that are selectable by a learner.

As described above, according to the present disclosure, it is possible to effectively display learning content including a large amount of information such as a multiple choice question within a screen having a limited size.

In addition, it is possible to display a question-solving time and a required time in learning content so that a learner can train to solve questions within a limited time.

In addition, it is possible to greatly improve the usability and readability in a learning application.

Further, it is possible to intuitively display the results of question-solving so as to allow a learner to easily grasp his or her weaknesses, thereby maximizing the learning effect.

MODE FOR CARRYING OUT THE INVENTION

The above aspects, features, and advantages will be described in detail with reference to the accompanying drawings and therefore, the technical ideas of the present disclosure can be easily practiced by a person with ordinary skill in the art to which the present disclosure pertains. Further, when it is determined that the detailed description of the known art related to the present disclosure may obscure the gist of the present disclosure, the detailed description thereof will be omitted.

In the drawings, the same reference numerals are used to designate the same or similar components, and all combinations described in the specification and claims can be combined in any manner. As used herein, the singular forms "a", "an" and "the" are intended to include the plural forms as well, unless the context clearly indicates otherwise.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof. The steps, processes, and operations of the method described here should not be construed as necessarily requiring execution in the particular order discussed or illustrated, unless an execution order is specifically identified. It is also understood that additional or alternative steps may be used.

In this specification, "touch input" refers to input for touching one area on a screen, and a "touch gesture" refers to one of touch inputs and can be understood to include movement from one area to another area on a screen, a continuous operation, and a multi-touch, which simultaneously touches two areas. That is, the "touch input" and the "touch gesture" used in this specification may indicate the same operation, but especially when they are used together, a touch operation for one area may be classified as "touch input" and an operation including a plurality of areas such as area movement may be classified as a "touch gesture".

Hereinafter, a preferred embodiment according to the present disclosure will be described in detail with reference to the accompanying drawings.

Figure 1:
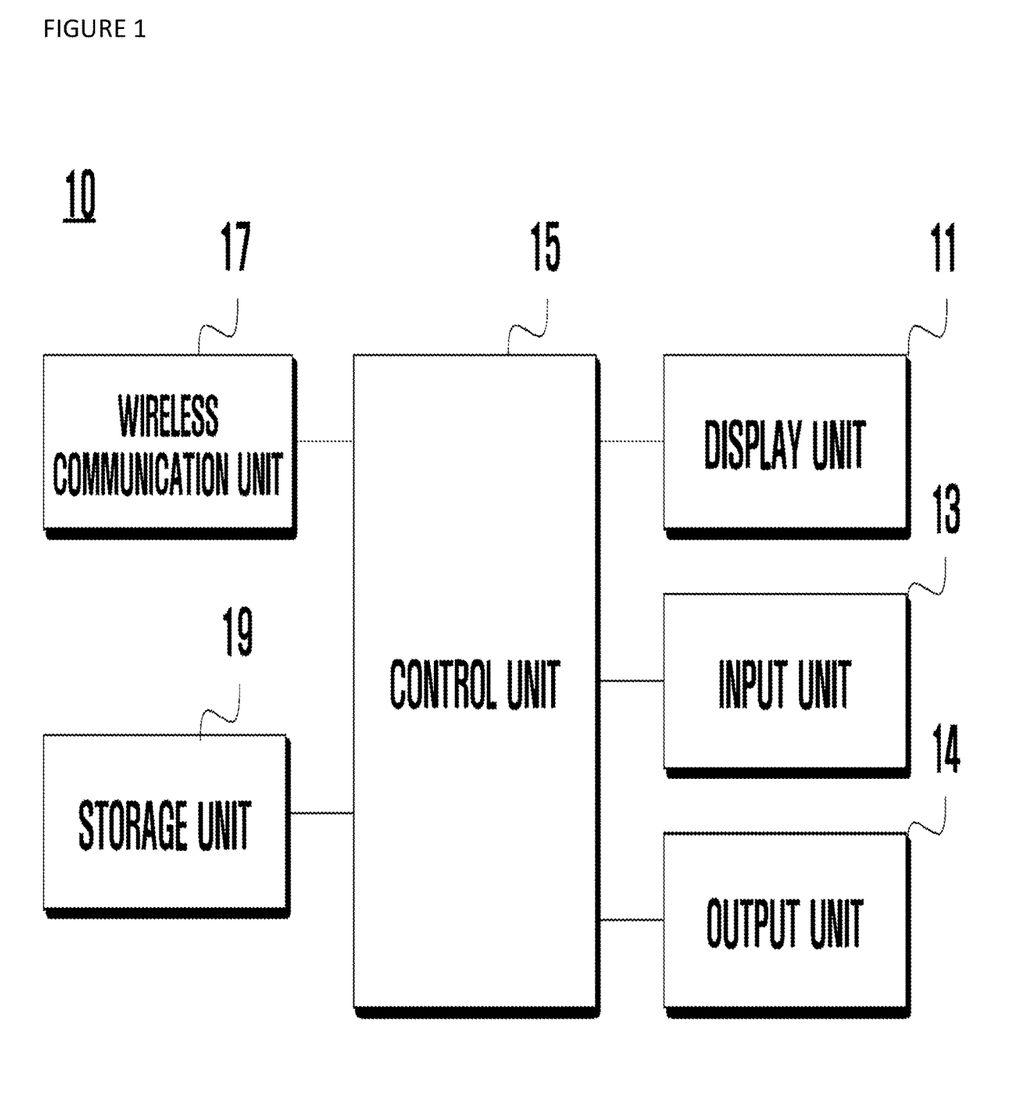
FIG. 1 is a block diagram illustrating the configuration of a terminal according to an embodiment of the present disclosure.

FIG. 1 is a block diagram illustrating the configuration of a terminal that displays content according to a method for displaying learning content of the present disclosure. Referring to FIG. 1, a terminal 10 according to an embodiment of the present disclosure may include a display unit 11, an input unit 13, an output unit 14, a control unit 15, a wireless communication unit 17, and a storage unit 19.

The display unit 11 may be formed of a liquid crystal display (LCD), an organic light-emitting diode (OLED), an active-matrix organic light-emitting diode (AMOLED), and the like, and may visually provide menus of the terminal 10, input data, function setting information, and other various types of information to a learner. The display unit 11 displays learning content according to a method for displaying learning content according to an embodiment of the present disclosure.

The input unit 13 detects a touch input of a learner. The input unit 13 may be constituted by a touch detection sensor, such as a capacitive overlay, a pressure type resistive overlay, or an infrared beam, or may be constituted by a pressure sensor. In addition to the above sensors, any type of sensor device capable of detecting the contact or pressure of an object may be included in the input unit 13 of the present disclosure.

The input unit 13 detects a touch input of a learner, and generates a detection signal and transmits the generated detection signal to the control unit 15. The detection signal includes coordinate data about where the touch input is performed by the learner. When a touch position movement operation is input by a learner, the input unit 13 may generate a detection signal including coordinate data of a touch position movement path and may transmit the generated detection signal to the control unit 15.

In particular, the input unit 13 may detect a touch input and a touch gesture performed on a layer according to an embodiment of the present disclosure. Examples of such learner input include a tap, a double tap, a press, a long press, a swipe, and the like.

When the terminal 10 to which the present disclosure is applied includes a touch screen, the above-described display unit 11 and input unit 13 may be included in the touch screen to perform respective functions of the touch screen. Further, when a terminal includes a touch pad, the touch pad can be used as the input unit 13.

The output unit 14 may include a speaker for outputting a sound, a light source for outputting light, and the like. In particular, in a listening mode, the output unit 14 may reproduce a listening question file stored in the storage unit 19.

The control unit 15 may control text with a group of questions to be displayed on a first layer and a first question card corresponding to a first question to be displayed on a second layer, and may control, when a continuous touch gesture in the touch input is received in the second layer, a second question card corresponding to a second question to be displayed on the second layer. In addition, each module is controlled to provide embodiments of each user interface, which will be described later, to a learner through the display unit 11.

The wireless communication unit 17 executes a data transmission/reception function for wireless communication of the terminal 10. The wireless communication unit 10 may receive data from a server (not shown) via a wireless channel and may transmit the received data to the control unit 15. The data transmitted to the server by the wireless communication unit 10 may include data such as a selection input performed through the input unit 13 by a learner who uses an application program of the present disclosure, a learning result according to the selection input, a learning pattern of the learner, and the like.

The storage unit 19 may store learning content called by the application program of the present disclosure, and may store information collected by the execution of the application program, for example, a selection input received through the above-described input unit 13, a learning result according to the selection input, learning pattern information by learning result analysis of the control unit 15, and the like.

Method for Displaying Learning Content

Hereinafter, a method for displaying learning content according to an embodiment of the present disclosure will be described with reference to FIGS. 2 to 4.

Figure 2:
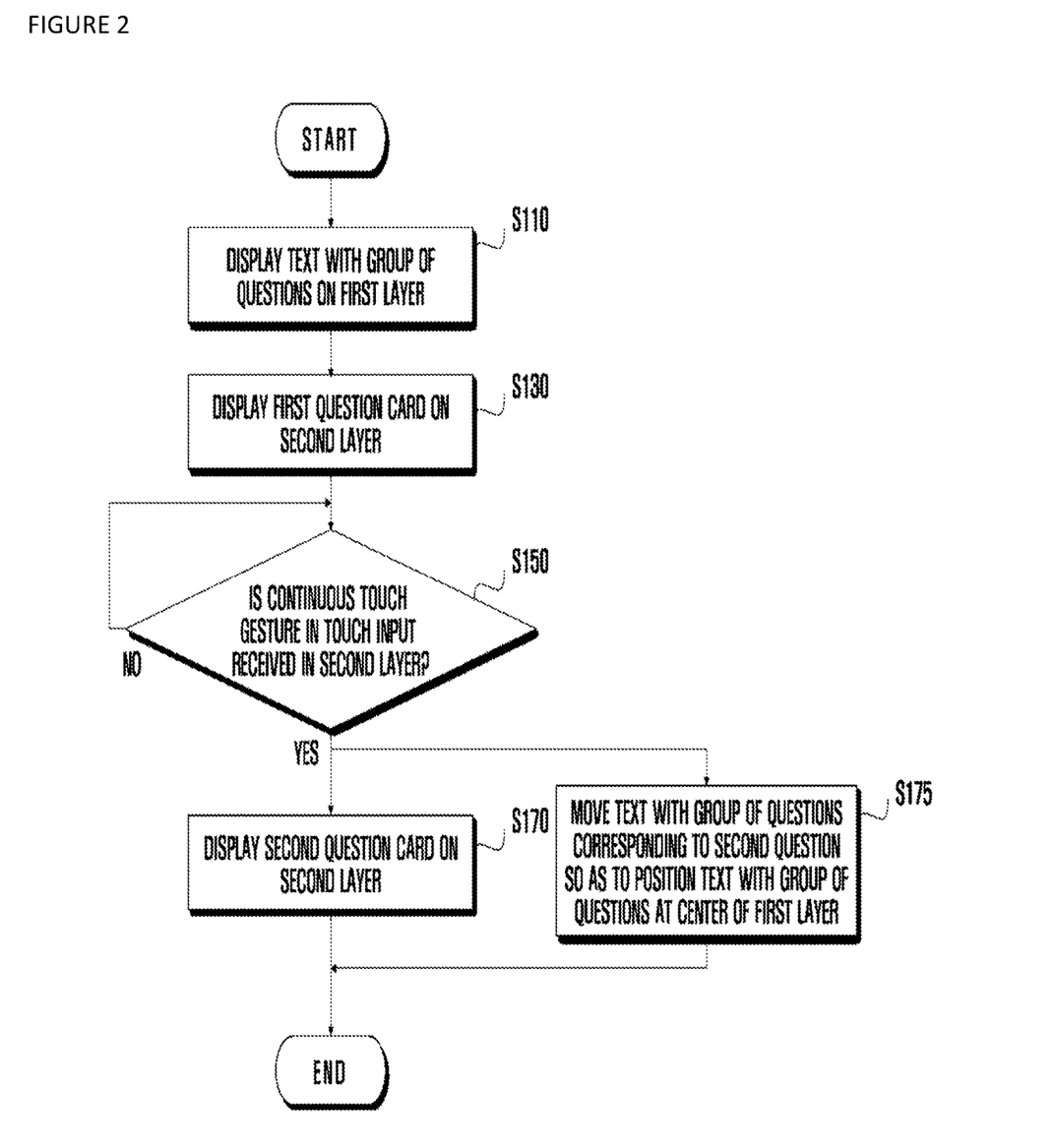
FIG. 2 is a flowchart illustrating a method for displaying learning content according to an embodiment of the present disclosure.

FIG. 2 is a flowchart illustrating a method for displaying learning content according to an embodiment of the present disclosure. The learning content displayed by the method for displaying learning content of the present disclosure may be generated by a device for generating a user interface screen, and may be displayed on a terminal by the execution of an application program according to an embodiment of the present disclosure.

For reference, it should be noted that each operation of the method for displaying learning content described in this specification can be simultaneously performed, and as a result, a plurality of layers can be simultaneously displayed on one screen in a terminal.

Figure 3:
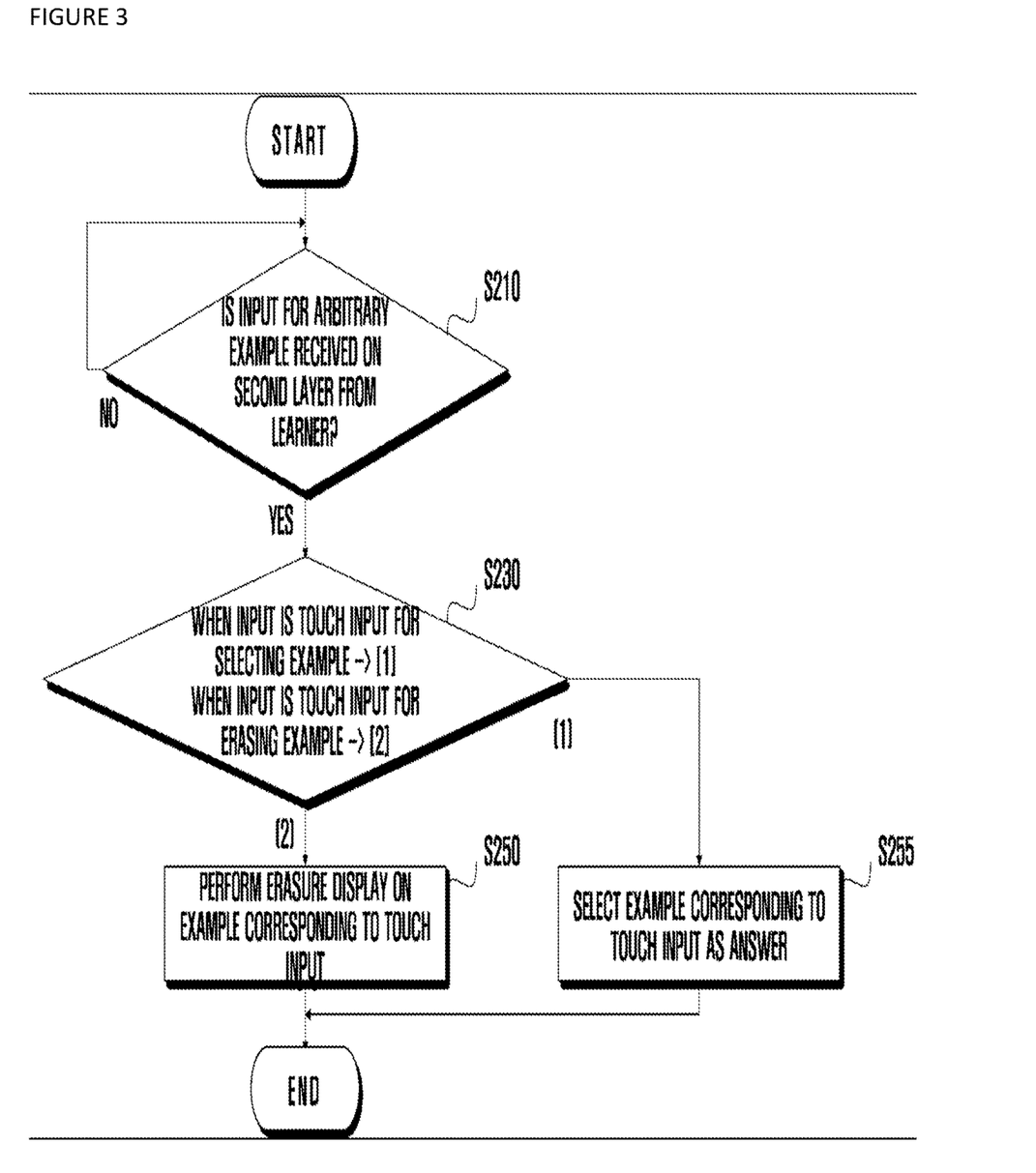
FIG. 3 is a flowchart illustrating a method for displaying learning content according to an embodiment of the present disclosure.
Figure 4:
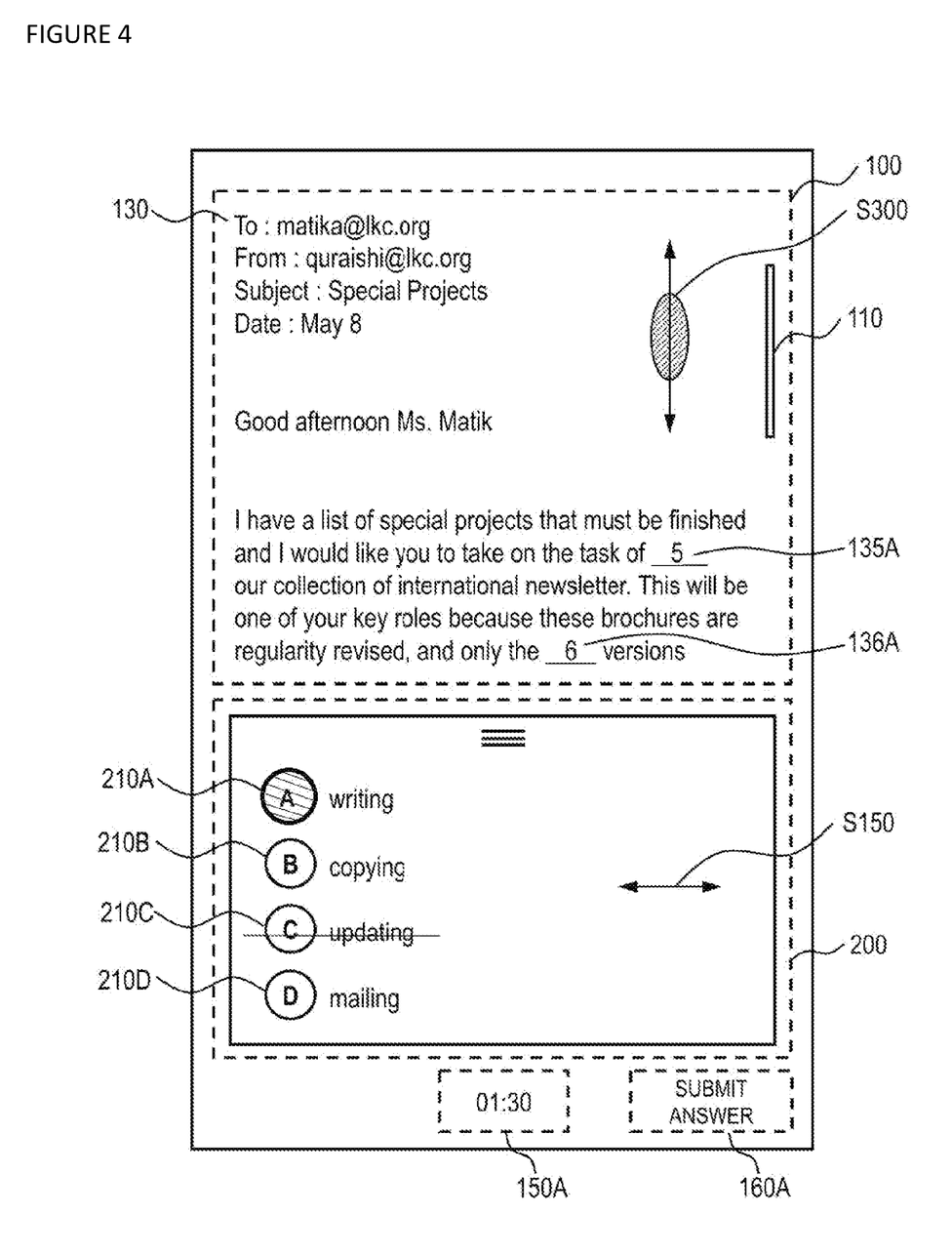
FIG. 4 is a diagram illustrating a method for displaying learning content in a question-solving mode according to an embodiment of the present disclosure.

Referring to FIGS. 2 to 4, in operation S110, a terminal displays text with a group of questions on a first layer 100. The text with a group of questions refers to text corresponding to one or more questions. For example, one block of text can be presented in a language test and a plurality of questions can be presented in association with the corresponding text. In this specification, the text associated with one or more questions is referred to as text with a group of questions.

In operation S130, the terminal displays a first question card corresponding to a first question on a second layer 200. The question card may include one or more examples 210 that can be selected by a learner. The question card may include one or more examples according to the type of the corresponding question, as shown in FIG. 4, or may further include questions.

For example, FIG. 4 shows a question of selecting the appropriate word to be inserted into the text. Accordingly, only words corresponding to examples are included on the question card, but if the text is read and a question pertaining to the text is set differently for each question, a question corresponding to the corresponding question may be included in the question card.

Next, when a continuous touch gesture in a touch input, such as a swipe, a drag, a double tap, a long tap, or a long press, is received in the second layer in operation S150, the terminal displays a second question card corresponding to a second question according to the touch gesture on the second layer in operation S170. For example, in the case in which the question card shown in FIG. 4 is a question card including examples for a question #5 135A, when the question card is swiped to the left, a question card including examples for a question #6 136A may be displayed on the second layer 200. If the touch gesture is an operation of swiping to the right, the terminal may switch the question card displayed on the second layer from the question card of the question #5 to a question card of a question #4.

Further, when the continuous touch gesture in the touch input is received in the second layer in operation S150 and the question card displayed on the second layer is switched from the first question card to the second question card in operation S170, the terminal moves, in operation 175, the text with the group of questions in such a manner that a portion corresponding to the second question in the text with the group of questions displayed on the first layer is positioned at the center of the first layer while operation S170 is performed.

For example, in FIG. 4, a question card #5 is currently displayed on the second layer, and therefore text corresponding to the question #5 is displayed in the central portion of the first layer 100. Here, when a touch gesture is input so that a question card #6 is displayed on the second layer 200 by the learner swiping the question card #5 to the left, the terminal moves the text displayed on the first layer 100 upwards so that a portion corresponding to the question #6 136A is positioned at the center of the first layer.

Further, when receiving selection input for an arbitrary example from the learner in the state in which a question card #1 is displayed on the second layer, the terminal may display a question card corresponding to a question following a question #1 on the second layer. That is, when the learner solves the question card #5, the question card #6 is automatically displayed on the second layer. At the same time, the corresponding screen is switched from the text corresponding to the question #5 to the text corresponding to the question #6, and the switched text corresponding to the question #6 is displayed at the central portion of the screen of the terminal. Accordingly, the learner can solve the questions sequentially without any special manipulation, so that the learner's convenience can be maximized and the learner can focus on the question-solving itself.

Meanwhile, as shown in 150A in FIG. 4, the terminal can display a remaining question-solving time in one area of the first layer. Most exams are designed to solve questions within a time limit. The learner can improve the speed of solving questions by checking the remaining question-solving time and training to solve questions within a time limit.

In addition, when not all of the text is displayed on the screen at the same time, as shown in FIG. 4, because the text with the group of questions is longer than the size of the first layer, the learner can move the text with the group of questions by inputting a touch gesture such as touching one area of the first layer 100 and dragging or swiping the text with the group of questions successively to the touch in operation S300.

That is, when the touch input is received on the first layer, the terminal may display a scroll bar corresponding to the length of the text with the group of questions on one area of the first layer, and when the continuous touch gesture in the touch input is received in the first layer in operation S300, the terminal may move the text with the group of questions displayed on the first layer according to the received touch gesture.

In addition, when selection input for all questions corresponding to the text with the group of questions is received, the terminal may further include an operation of displaying a text or image corresponding to an answer submission on one area of the first layer. For example, if there is a total of 4 questions corresponding to one block text with a group of questions and the learner inputs answers to all of the 4 questions, the text "submit answer" is displayed on the lower end side of the first layer as shown in FIG. 160A of FIG. 4. When the learner touches the text "submit answer", the answer is transmitted to a server and the screen is switched to a correct-answer confirmation mode. In the above description, the case has been described in which a link pertaining to a question-solving time or to whether the answer submission is performed is displayed at the lower end side of the first layer. However, this is only an embodiment, and a user interface according to the present disclosure creates a separate layer to display a previous menu, a next menu, time information, etc., on the created layer, which may vary depending on the setting of the user interface.

User Interface to Erase Example

Referring to FIG. 3, a terminal may receive input for an arbitrary example from a learner in operation S210. When the input in operation S210 is touch input for erasing an example in operation 230, the terminal may perform erasure display on the example corresponding to the touch input in operation S250. When the input in operation S210 is touch input for selecting an example, the terminal may select the example corresponding to the touch input as the answer in operation S255.

Whether a touch input for an arbitrary example is determined to be a selection input or an erasure input in operation S230 depends on preset criteria. For example, a tab or press for one area may be preset to be determined to be selection input and a double tap, a long press, or swipe may be preset to be determined to be erasure input, which may vary depending on the setting of a device for generating a user interface.

Referring to FIG. 4, when the learner performs a touch input for selecting an example A 210A, the terminal may select and highlight the example A 210A as the answer, and when the learner inputs a double-tap operation for erasing an example C 210C, the terminal may perform erasure display by displaying a strikethrough on the example C 210C. The erasure display may be performed via the strikethrough, blurring of brightness and saturation, shading adjustment, or the like. It is a well-known question-solving method to erase examples. According to the present disclosure, the conventional question-solving method may be implemented as a user interface, so that learners can effectively solve questions even on the terminal.

User Interface to Adjust Layer Size

Meanwhile, in the embodiment of FIG. 4, areas of the first layer 100 and the second layer 200 are divided. Referring to another embodiment shown in FIGS. 7A and 7B, the second layer 200 may be overlaid on the first layer. That is, the first layer may be displayed on the entire screen, and the second layer 200 may be overlaid on one area of the first layer.

Figure 7A:
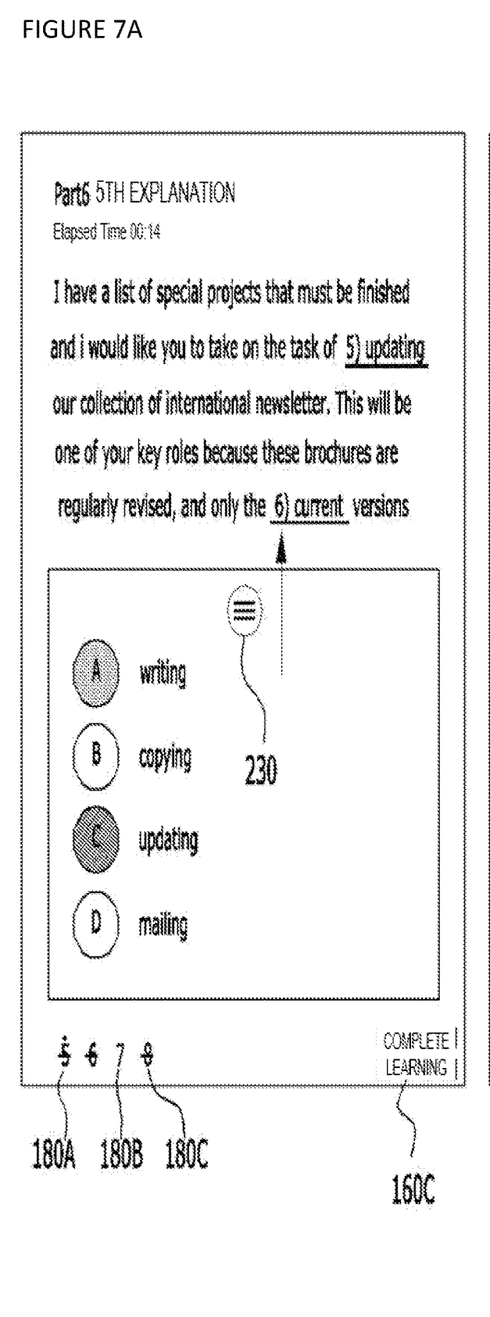
FIGS. 7A and 7B are diagrams illustrating a method for displaying learning content in an explanation mode according to an embodiment of the present disclosure.
Figure 7B:
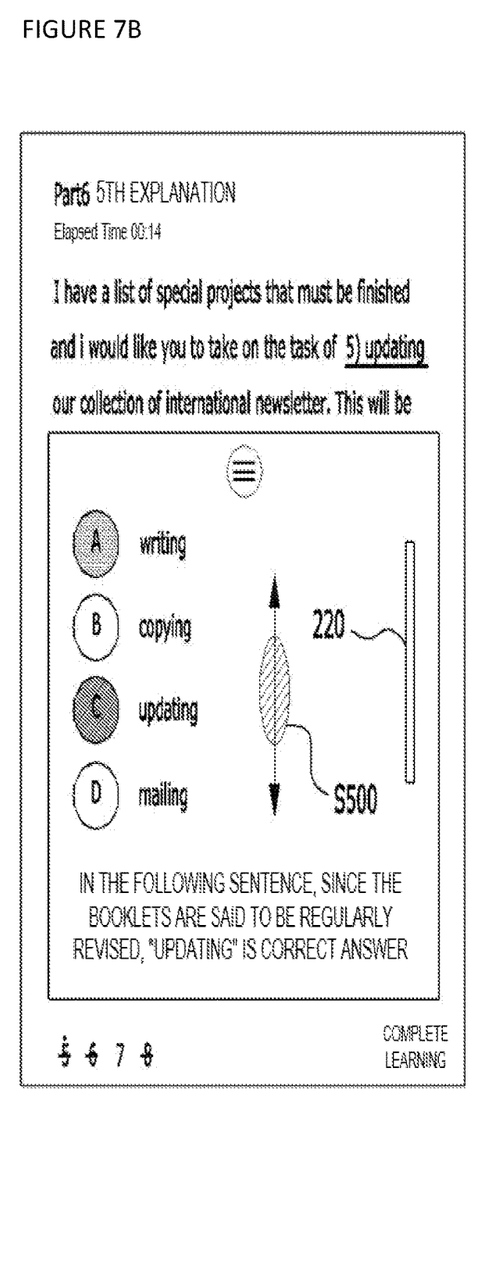

In this case, one area of the second layer may be designated as an area for adjusting the size of the second layer, which may be displayed as an image 230 shown in FIG. 7A. When receiving a first touch input for selecting a portion (hereinafter, referred to as a scaling area) 230 designated as a scaling area on the second layer from a learner and receiving a continuous first touch gesture in the first touch input, the terminal may adjust the size of the second layer according to the touch gesture. For example, if the learner touches the scaling area and then drags it upwards, the size of the second layer may become large, as shown in FIG. 7B. Such a user interface has an advantage in that a large amount of text can be effectively displayed on a limited screen, and content displayed based on content currently checked by the learner between text and question cards can be adjusted.

User Interface in Correct-Answer Confirmation Mode

Hereinafter, an embodiment of a method for displaying learning content in the correct-answer confirmation mode after a learner completes question-solving and submits the answer will be described.

Figure 5:
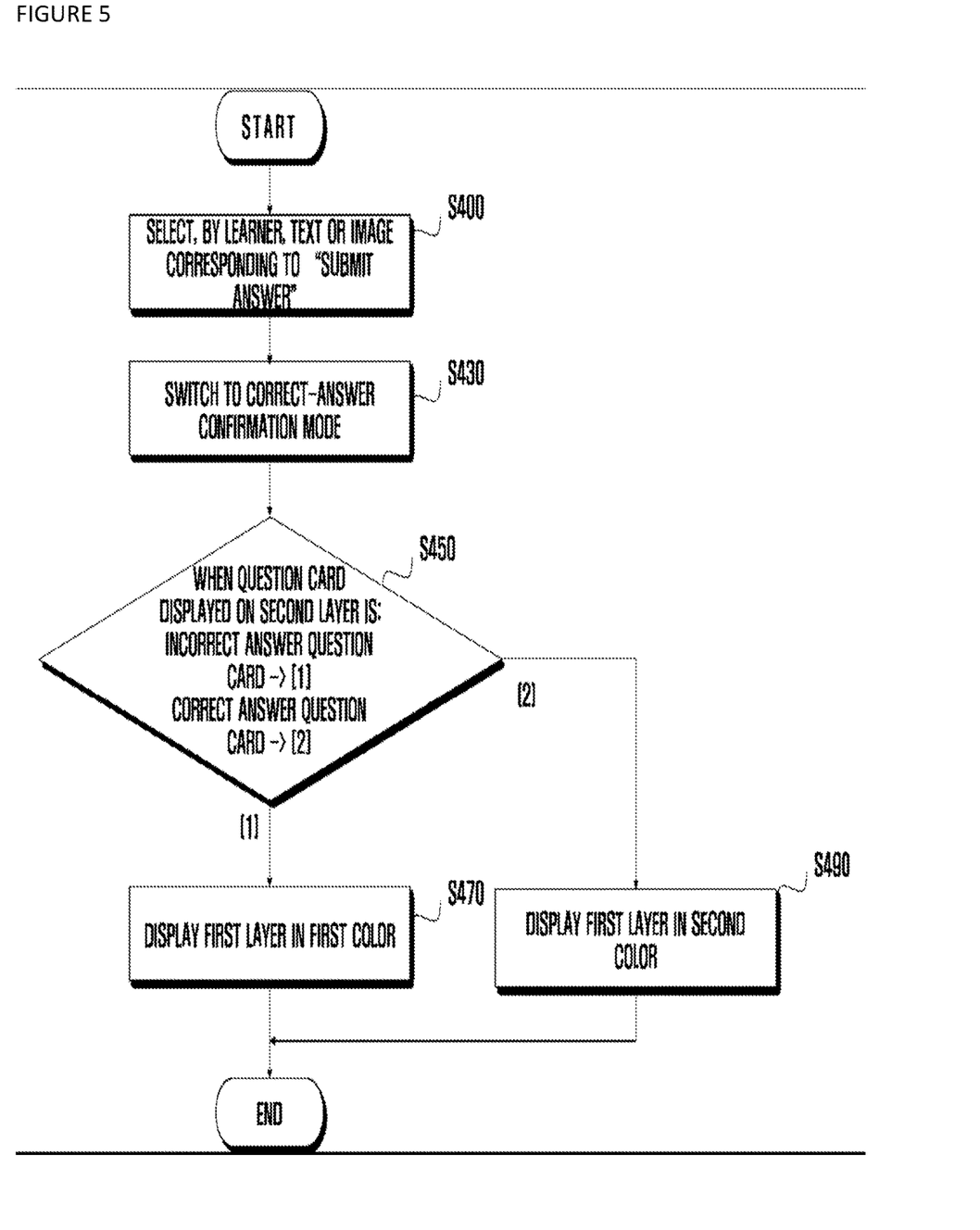
FIG. 5 is a flowchart illustrating a method for displaying learning content in a correct-answer confirmation mode according to an embodiment of the present disclosure.

Referring to FIG. 5, when a learner selects a text or image corresponding to answer submission in operation S400, a terminal switches to a correct-answer confirmation mode for displaying learning content using submitted answers in operation S430. An example of a user interface in the correct-answer confirmation mode is shown in FIGS. 6A and 6B.

Figure 6A:
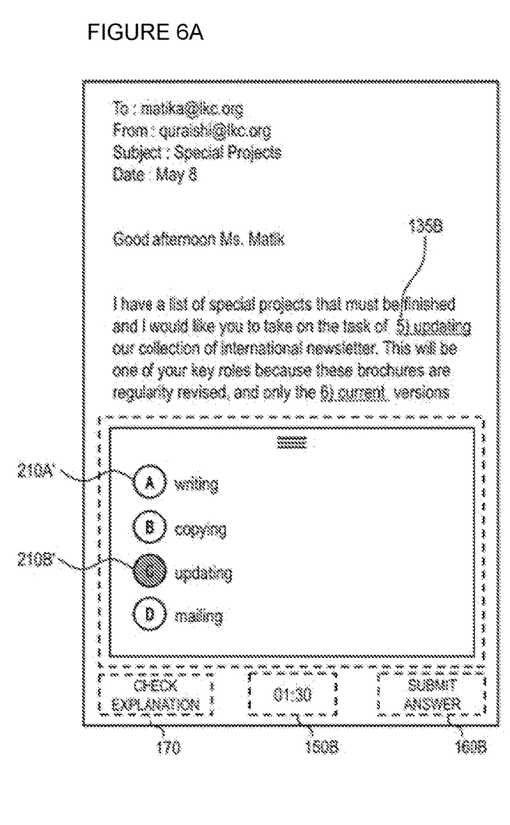
FIGS. 6A and 6B are diagrams illustrating a method for displaying learning content in a correct-answer confirmation mode according to an embodiment of the present disclosure.
Figure 6B:
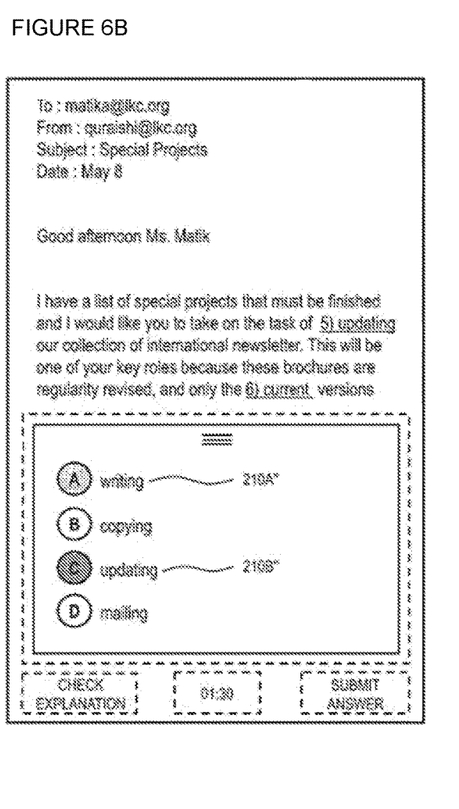

As shown in FIGS. 6A and 6B, when a question card in which the submitted answer is incorrect is displayed on the second layer in the correct-answer confirmation mode as shown in FIG. 6A, a terminal may display a first layer and/or the second layer in a first color in operation S470, and when a question card in which the submitted answer is correct is displayed on the second layer, the terminal may display the first layer and/or the second layer in a second color in operation S490. Here, the first color and the second color may be colors having different brightness and saturation, and a user interface according to an embodiment of the present disclosure may distinguish and display incorrect answers and correct answers in an operation of confirming correct answers so that learners may intuitively grasp their weaknesses.

In addition, on the screen of the correct-answer confirmation mode, when displaying the question card in which the submitted answer is the incorrect answer on the second layer, the terminal may differently display the brightness and/or the saturation of examples corresponding to the submitted answer and the correct answer.

For example, it is assumed that the correct answer of the question #5 135B is "C. updating" as shown in FIG. 6B, and a learner selects "A. writing" as the answer and submits the selected answer in a question-solving operation. The terminal may provide a user interface in which the terminal differently displays the brightness and/or the saturation of an answer 210A" submitted by the learner and a correct answer 210B" so that the learner can compare the correct answer with the answer input by herself or himself when confirming the correct answer. In this example, if the learner selects "C. updating", only the correct answer 210B' may be highlighted, as shown in the screen of FIG. 6A.

Meanwhile, in the correct-answer confirmation mode, the learner confirms the correct answer to each of one or more questions that he or she has solved. In this case, if an arbitrary question card is displayed on the second layer, the terminal may highlight one or more words corresponding to the arbitrary question card in text with a group of questions displayed on the first layer. That is, when the learner confirms the correct answer to the question #5, as shown in FIGS. 6A and 6B, it is possible to highlight the letters of the question #5 displayed in the text, such as enlarging the letters, displaying the letters in bold, or displaying the letters in a different color, so that the learner can intuitively recognize exactly what the question he or she is checking is.

In addition, in the correct-answer confirmation mode, the terminal may display, on one area of the first layer, at least one of the time 150B required for question-solving, a text or image 170 corresponding to switching to an explanation mode, and a text or image 160B corresponding to a termination command. As described above, the terminal may generate a new layer and include the above information in the new layer.

When the learner touches the text or image 170 corresponding to the switching to the explanation mode, the terminal may switch the screen to the explanation mode, and the user interface in the explanation mode will be described later with reference to FIGS. 7A and 7B.

In the explanation mode, the terminal may generate a third layer fixed in one area of the terminal and may display one or more question numbers and/or the text or image corresponding to the termination command on one area of the third layer.

User Interface in Explanation Mode

Referring to FIGS. 7A and 7B, in the explanation mode, the terminal may generate a third layer fixed in one area of the terminal and may display one or more question numbers 180 and/or a text or image 160C corresponding to a termination command on one area of the third layer.

The question number 180, displayed in a manner indicating that question-solving is completed, may be displayed differently depending on whether the submitted answer is correct or incorrect. If the submitted answer is correct, the answer may be displayed in a form shown in 180B. If the submitted answer is incorrect, the answer may be displayed in a form including a strikethrough shown in 180C. This is only an example, so the colors of the correct answer and the incorrect answer can be displayed differently or figures can be used, so that the learner can intuitively distinguish a question for which a correct answer was submitted by the learner from a question for which an incorrect answer was submitted by the learner.

In addition, in displaying the question number 180, the terminal may differently display a question number corresponding to a question that is currently confirmed. In this case, the terminal adds a point or inserts a figure on the question number as shown in 180A so that the learner can intuitively recognize what the question number he or she is checking is.

In the explanation mode, the configuration of the user interface for adjusting the size of the second layer may be effective. Since the explanation includes not only examples but also a long text, the learner touches one area of the second layer and inputs a touch gesture successive thereto in operation S500, thereby moving an explanation card displayed on the second layer.

When the learner completes all of the learning and touches a learning completion button 160C displayed at the lower end side of the first layer, the screen of the terminal can be switched to an initial screen or the previous screen.

User Interface in Listening Mode

Hereinafter, a method for displaying learning content in a listening mode according to an embodiment of the present disclosure will be described with reference to FIGS. 8A and 8B.

Figure 8A:
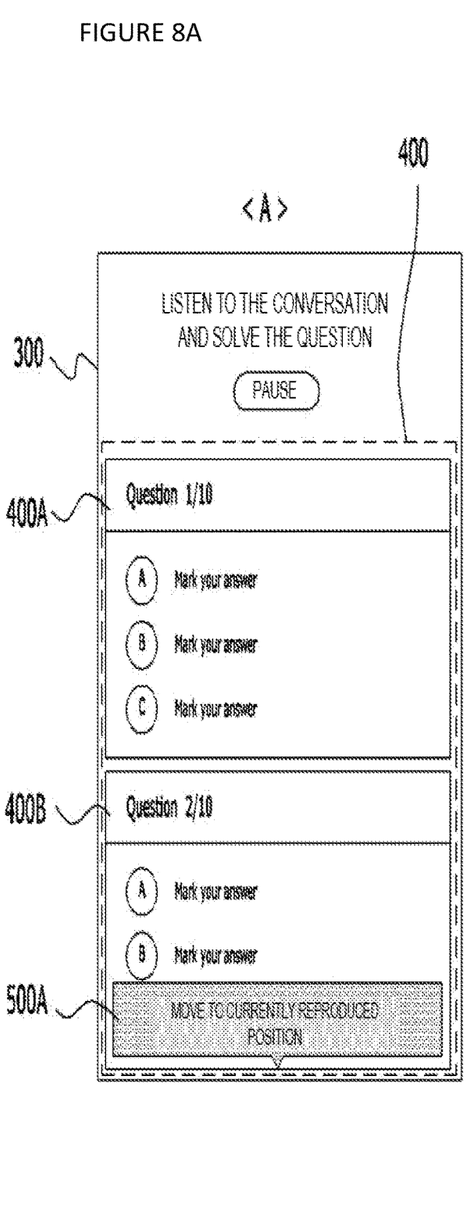
FIGS. 8A and 8B are diagrams illustrating a method for displaying learning content in a listening mode according to an embodiment of the present disclosure.
Figure 8B:
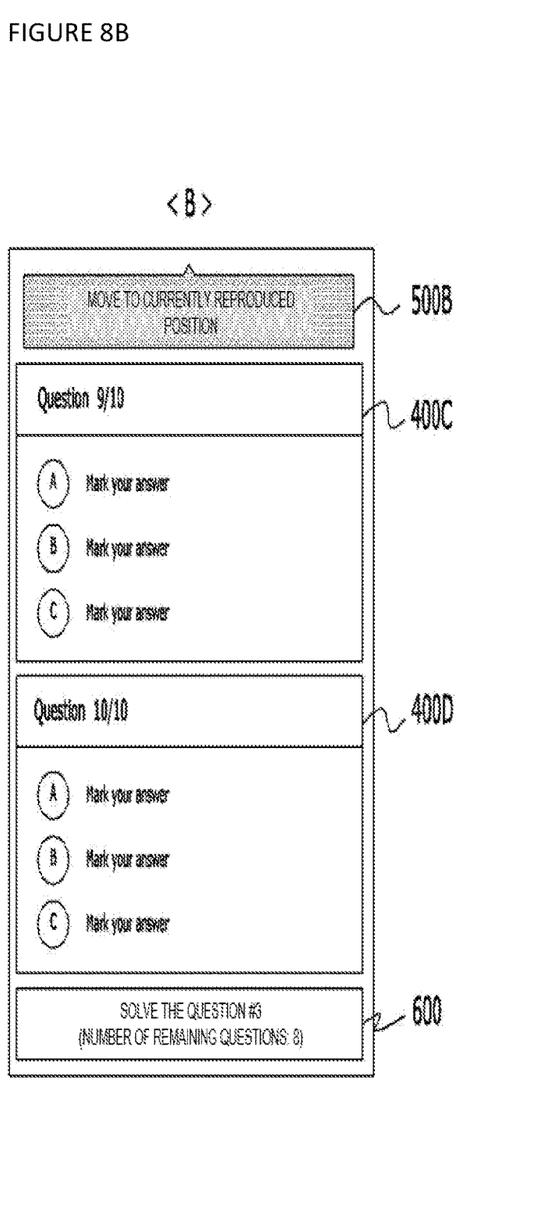

Referring to FIGS. 8A and 8B, a terminal in the listening mode may display a fourth layer 400 on a background layer 300 and may display one or more question cards 400A to 400D on the fourth layer 400. Next, the terminal may sequentially reproduce one or more voice files corresponding to each of the one or more question cards. At this time, if the question card corresponding to the currently reproduced voice file is not displayed on the fourth layer, the terminal may display movement indicators 500A and 500B on the fifth layer 500.

More specifically, in displaying the movement indicators on the fifth layer, when an arbitrary question card displayed on the fourth layer is a question previous to that of the question card corresponding to the currently reproduced voice file, the terminal may display the movement indicator at the lower end side of the fifth layer, as shown in 500A. When the arbitrary question card displayed on the fourth layer is a question subsequent to that of the question card corresponding to the currently reproduced voice file, the terminal may display the movement indicator at the upper end side of the fifth layer, as shown in 500B.

Further, when receiving a touch input for the movement indicator, the terminal may display the question card corresponding to the currently reproduced voice file on the fourth layer.

That is, if the currently reproduced voice file corresponds to the question #5 although questions displayed on the fourth layer 400 are a question #1 and a question #2 in FIG. 7A, a movement indicator 500A of "move to currently reproduced position" may be displayed at the lower end side of the terminal, and if the learner touches the movement indicator 500A of "move to currently reproduced position", the question #5 may be displayed at the central portion of the fourth layer.

In addition, if the currently reproduced voice file corresponds to the question #2 although a question #9 and a question #10 are displayed on the fourth layer 400 in FIG. 7B, a movement indicator 500B may be displayed at the upper end side of the fifth layer 500. If the learner touches the movement indicator 500B, the question displayed on the fourth layer may be switched to the question #2.

In addition, when the reproduction of the voice file corresponding to all of the questions is completed in the listening mode, or when a continuous touch gesture (drag or the like) in a touch input is received so that the last question is displayed on the fourth layer, the terminal may display the number of remaining questions at the lower end portion of the background layer using a selection input for each of the questions, as shown in an image 600. That is, when the learner performs selection input for selecting examples for only two questions among a total of 10 questions, 8, which is the number of remaining questions, may be displayed at the lower end portion based on the selection input. This display may be performed in such a manner that the image 600 can be displayed on the background layer 300 or the fourth layer 400 on which the corresponding question is displayed, or may be performed by generating a new layer. The present disclosure is not limited as to the method of implementing the user interface.

The methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Certain embodiments of the techniques described above include processing steps and instructions described herein in an algorithmic form. It should be noted that the processing steps and instructions described above may be implemented in software, firmware, or hardware, and when they are implemented in software, they may be downloaded to reside on other platforms used in real-time network operating systems and can be operated therefrom.

The present disclosure also relates to apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Moreover, the computers referred to herein may include a single processor, or architectures that use multiple processor designs to enhance computing capabilities.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein. It should be understood that any reference to a particular language is intended to be illustrative of the embodiments and best mode of the present disclosure.

Some embodiments omitted in this specification are equally applicable if their implementation subjects are the same. It will be apparent to those skilled in the art that various modifications and variations can be made in the present disclosure without departing from the spirit or scope of the disclosure. The present disclosure is not limited to the above-described embodiments and the accompanying drawings.

The invention claimed is:

1. A method for displaying learning content of a terminal, the method comprising:
    displaying a text paragraph with a group of questions on a first layer, the group of questions being embedded in different locations of the text paragraph;
    displaying a first question card corresponding to a first question included in the group of questions on a second layer;
    when a first touch input on the second layer is received, switching from the first question card displayed on the second layer to a second question card corresponding to a second question included in the group of questions in response to the first touch input;
    when all selection inputs for selecting an arbitrary example for each question that are included in the group of questions are received, switching to a correct-answer confirmation mode; and
    when the correct-answer confirmation mode is switched to an explanation mode by a selection of a learner, displaying one or more question numbers corresponding to one or more questions for which question-solving is completed by the learner on one area of a third layer, wherein among the one or more question numbers, a question number in which a submitted answer is correct and a question number in which a submitted answer is incorrect are displayed to be differentiated from each other.

2. The method as claimed in claim 1, further comprising:
    receiving a first touch input for selecting one area of the second layer, wherein the second layer is overlaid on the first layer; and
    when a continuous touch gesture in the first touch input is received, adjusting a size of the second layer according to the continuous touch gesture.

3. The method as claimed in claim 1, further comprising:
    before all the selection inputs are received, displaying a question card corresponding to a question subsequent to the second question on the second layer when the selection input for the arbitrary example among examples related to the second question included in the second question card is received from the learner.

4. The method as claimed in claim 1, further comprising:
    when receiving a second touch input for erasing an arbitrary example among the examples related to the second question included in the second question card is received from the learner, displaying an erase mark on the arbitrary example corresponding to the second touch input,
    wherein the second touch input includes at least one of a double tap, a long press, and a swipe performed on the example to be erased.

5. The method as claimed in claim 1, further comprising:
    displaying a remaining question-solving time on one area of the first layer.

6. The method as claimed in claim 1, further comprising:
    displaying a scroll bar corresponding to a length of the text with the group of questions on one area of the first layer when a second touch input is received on the first layer, and moving, when a continuous touch gesture in the second touch input is received in the first layer, the text with the group of questions displayed on the first layer according to the received touch gesture.

7. The method as claimed in claim 1, wherein the switching to the correct-answer confirmation mode comprises:
    displaying a text or image corresponding to answer submission on one area of the first layer when all the selection inputs for selecting the arbitrary example for each question that are included in the group of questions is received; and
    switching to the correct-answer confirmation mode when the learner selects the text or image corresponding to the answer submission.

8. The method as claimed in claim 1, further comprising:
    displaying the first layer and/or the second layer in a first color when a question card in which the submitted answer is incorrect is displayed on the second layer in the correct-answer confirmation mode; and
    displaying the first layer and/or the second layer in a second color when a question card in which the submitted answer is correct is displayed on the second layer in the correct-answer confirmation mode.

9. The method as claimed in claim 8, further comprising:
    differently displaying an example corresponding to the submitted answer and an example corresponding to the correct answer, when the question card in which the submitted answer is incorrect is displayed on the second layer.

10. The method as claimed in claim 8, further comprising: highlighting, when an arbitrary question card is displayed on the second layer in the correct-answer confirmation mode, one or more words corresponding to the arbitrary question card in the text with the group of questions displayed on the first layer.

11. The method as claimed in claim 1, further comprising: displaying at least one of a time required for question-solving on one area of the first layer, a text or image corresponding to switching to the explanation mode, and a text or image corresponding to a termination command.

12. The method as claimed in claim 1, wherein the switching of the correct-answer confirmation mode to the explanation mode is performed in a case of a text or image corresponding to switching to the explanation mode being selected by the learner.

13. The method as claimed in claim 1, wherein a text or image corresponding to a termination command is further displayed on one area of the third layer.

14. The method as claimed in claim 1, wherein among the one or more question numbers display on the one area of the third layer, a question number of a question of which an explanation is being confirmed by the learner is displayed to be differentiated from remaining question numbers.

15. The method as claimed in claim 1, wherein the first touch input includes at least one of a tap, a press, a swipe, a drag, a double tap, a long tap, and a long press.

16. A method for displaying learning content of a terminal, the method comprising:
displaying text with a group of questions on a first layer;
displaying a first question card corresponding to a first question included in the group of questions on a second layer;
when a first touch input on the second layer is received, switching from the first question card displayed on the second layer to a second question card corresponding to a second question included in the group of questions in response to the first touch input;
when the correct-answer confirmation mode is switched to an explanation mode by a selection of a learner, displaying one or more question numbers corresponding to one or more questions for which question-solving is completed by the learner on one area of a third layer, wherein among the one or more question numbers, a question number in which a submitted answer is correct and a question number in which a submitted answer is incorrect are displayed to be differentiated from each other; and
moving the text with the group of questions so that a portion corresponding to the second question in the text with the group of questions is positioned at a center of the first layer;
when all selection inputs for selecting an arbitrary example for each question that are included in the group of questions are received, switching to a correct-answer confirmation mode; and
when the correct-answer confirmation mode is switched to an explanation mode by a selection of a learner, displaying one or more question numbers corresponding to one or more questions for which question-solving is completed by the learner on one area of a third layer,
wherein among the one or more question numbers, a question number in which a submitted answer is correct and a question number in which a submitted answer is incorrect are displayed to be differentiated from each other.

17. A method for displaying learning content of a terminal, the method comprising:
displaying a text paragraph with a group of questions on a first layer, the group of questions being embedded in different locations of the text paragraph;
displaying a first question card corresponding to a first question included in the group of questions on a second layer; and
when a first touch input on the second layer is received, switching from the first question card displayed on the second layer to a second question card corresponding to a second question included in the group of questions in response to the first touch input; and
highlighting one or more words related to the second question in the text paragraph with the group of questions,
wherein a question card displayed on the second layer includes one or more examples that are selectable by a learner.

18. A terminal for displaying learning content, comprising:
a display unit configured to display one or more layers;
an input unit configured to receive an input; and
a control unit configured to
control a text paragraph with a group of questions to be displayed on a first layer displayed on a screen of the display unit, the group of questions being embedded in different locations of the text paragraph;
control a first question card corresponding to a first question included in the group of questions to be displayed on a second layer;
when a first touch input corresponding to an arbitrary direction on the second layer is received, control the first question card displayed on the second layer to be switched to a second question card corresponding to a second question included in the group of questions in response to the first touch input;
when all selection inputs for selecting an arbitrary example for each question that are included in the group of questions are received, control to switch to a correct-answer confirmation mode; and
when the correct-answer confirmation mode is switched to an explanation mode by a selection of a learner, control one or more question numbers corresponding to one or more questions for which question-solving is completed by the learner to be displayed on one area of a third layer,
wherein among the one or more question numbers, a question number in which a submitted answer is correct and a question number in which a submitted answer is incorrect are displayed to be differentiated from each other.

* * * * *